May 15, 1934.  S. COHEN  1,959,197
VARIABLE CONDENSER
Filed Nov. 4, 1925   3 Sheets-Sheet 3
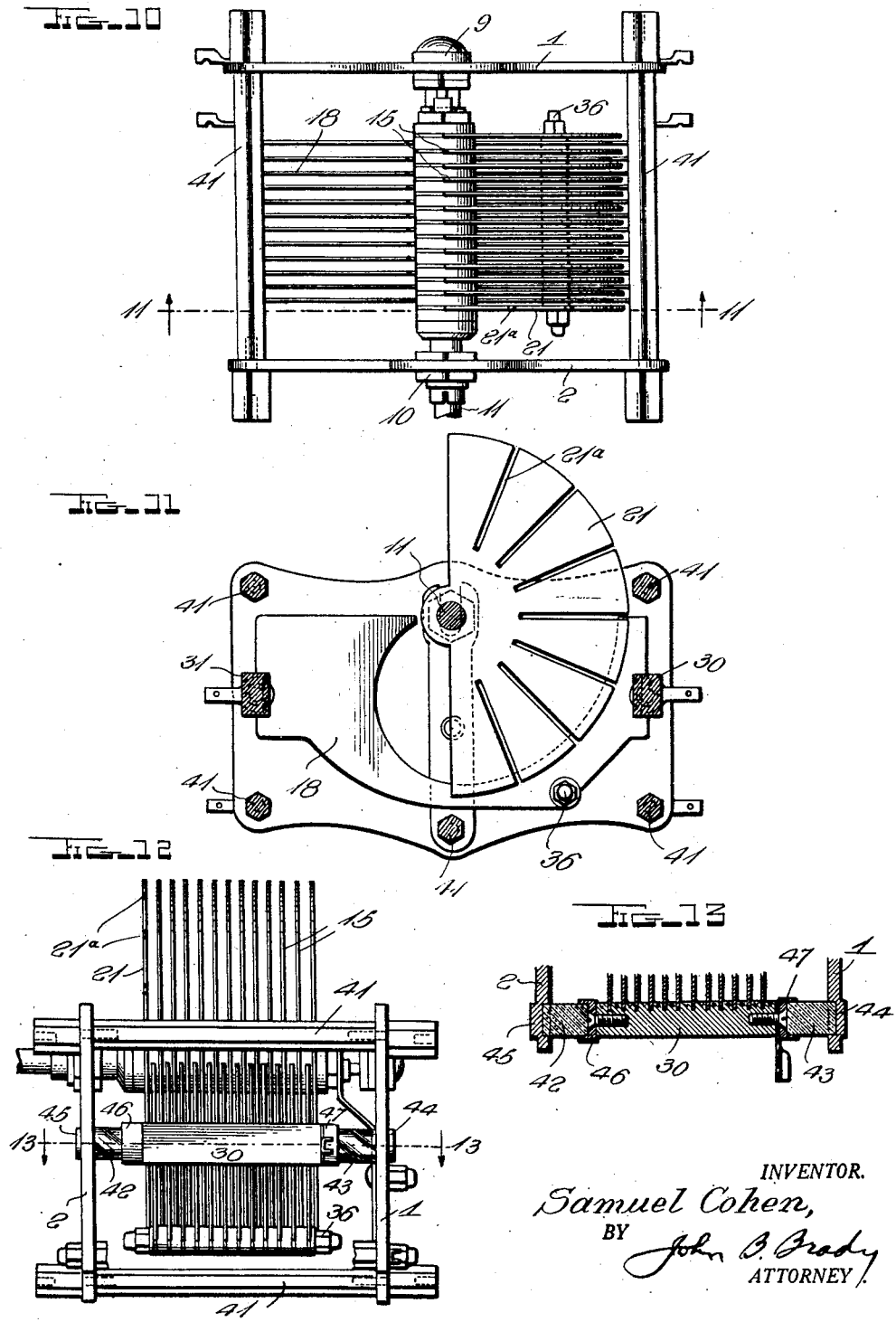
INVENTOR.
Samuel Cohen,
BY John B. Brady
ATTORNEY Patented May 15, 1934

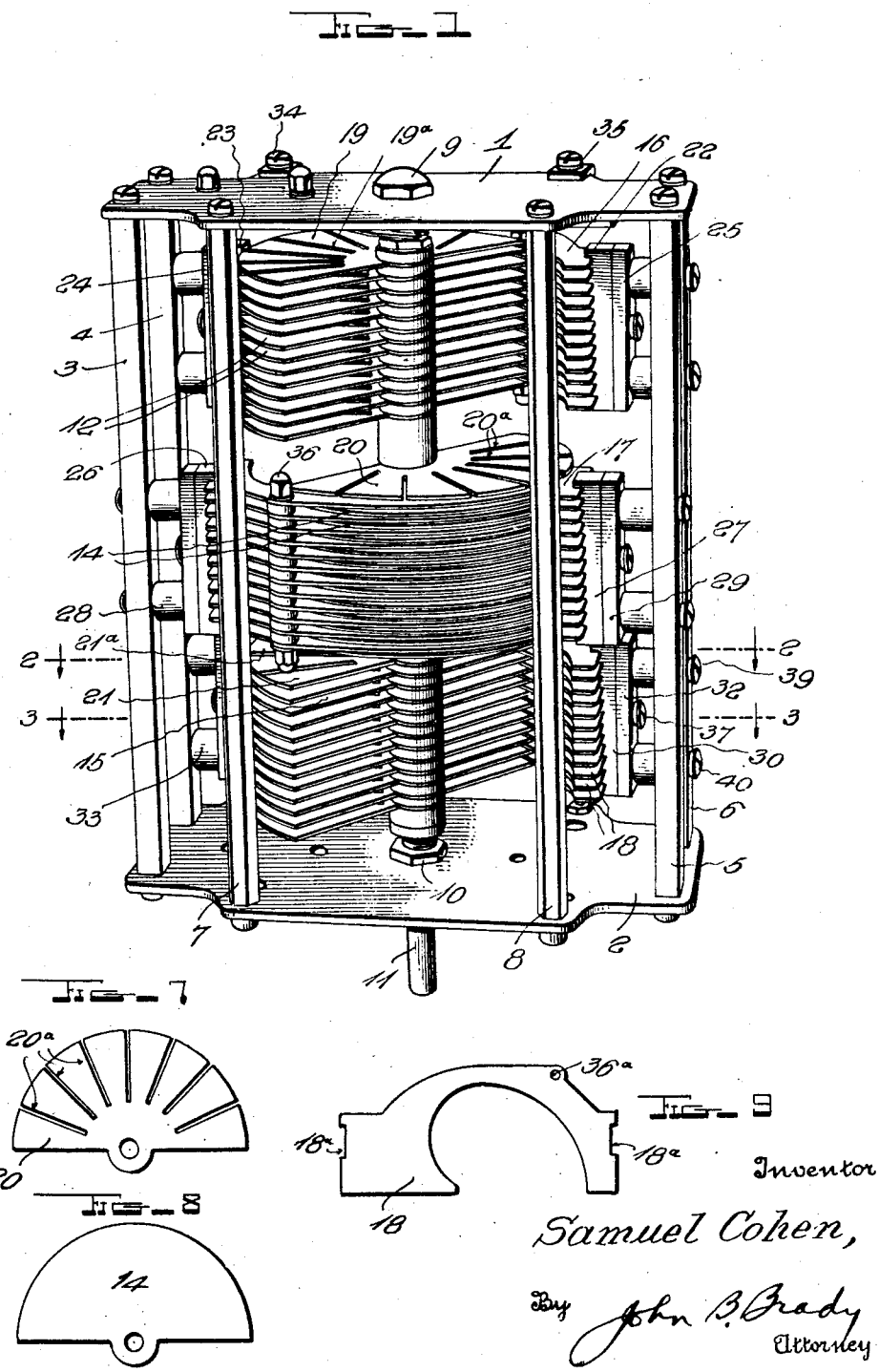

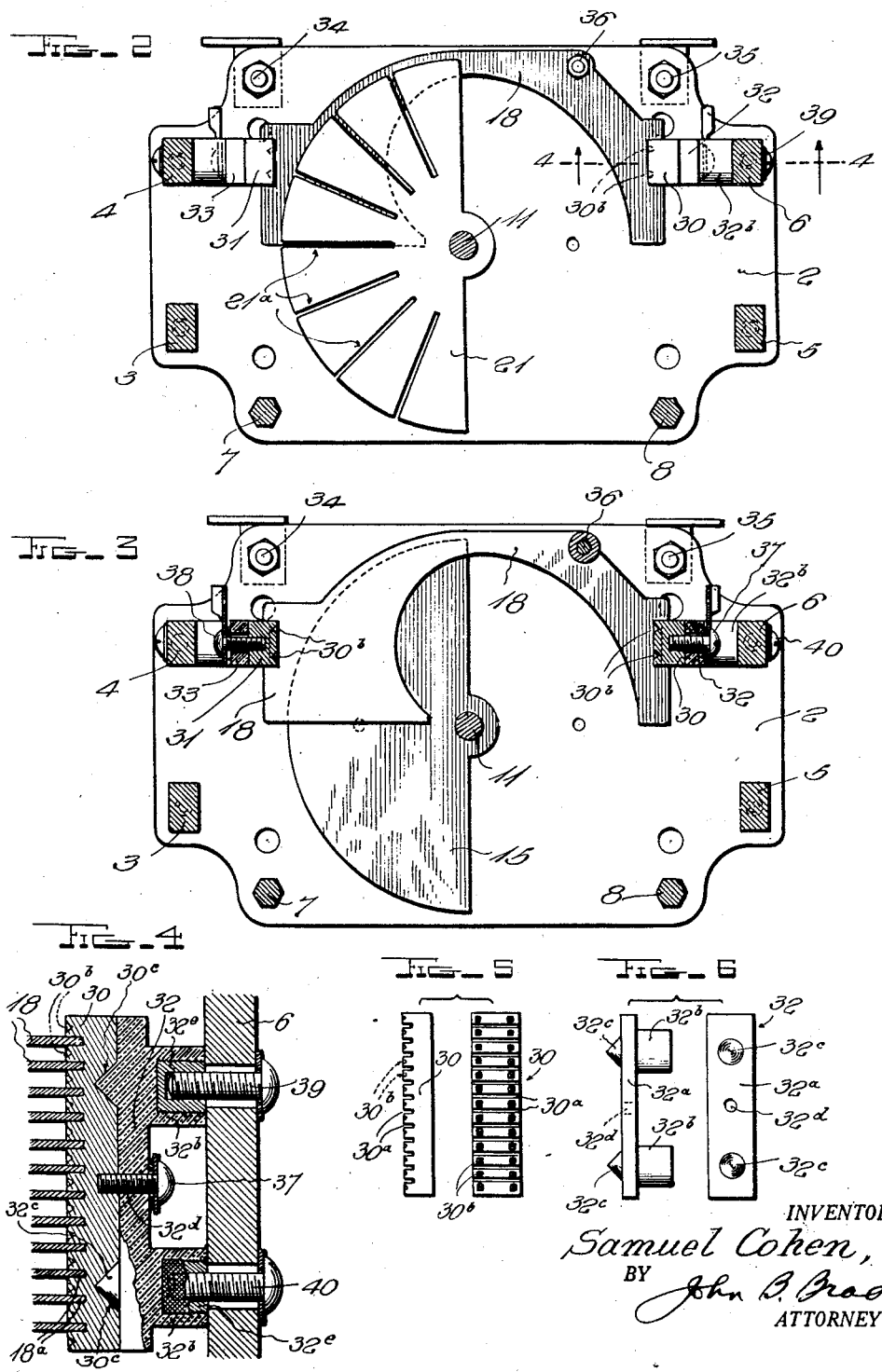

1,959,197

UNITED STATES PATENT OFFICE 1,959,197

VARIABLE CONDENSER

Samuel Cohen, Brooklyn, N. Y., assignor to Radio Corporation of America, New York, N. Y., a corporation of Delaware Application November 4, 1925, Serial No. 66,745

2 Claims. (Cl. 175—41.5)

My invention relates broadly to variable electrical condensers and more particularly to a compact construction of variable electrical condenser having means whereby the capacities of a plurality of condenser units may be matched with respect to associated electrical circuits.

One of the objects of my invention is to provide a variable condenser construction for the control of a plurality of electrical circuits simultaneously, where sections of the condenser may be matched with respect to the characteristics of the electrical circuits, in which the condenser units are electrically connected.

Another object of my invention is to provide a construction of variable condenser in which the capacity may be adjusted with a high degree of precision for cooperation with electrical circuits of predetermined characteristics.

Still another object of my invention is to provide a variable condenser construction in which the area of the stator or rotor plates may be suitably changed to compensate for differences in the electrical circuits with which the condenser is associated for increasing the precision in the tuning of the electrical circuit.

A further object of my invention is to provide means for mounting a plurality of sets of stator plates within the frame of a condenser for cooperation with a plurality of sets of rotor plates journaled upon a shaft mounted in the condenser frame, in such manner that the sets of stator and rotor plates may be variably interleaved with improved means for mounting the stator plates laterally within the condenser frame.

A still further object of my invention is to provide means for mounting the stator plates of a variable electrical condenser, where the peripheral edges of the stator plates are secured in grooves formed in conductive block members, where the material of the conductive blocks may be compressed and spread at points between the stator plates for moving the metal of the conductive blocks into position with respect to the edges of the stator plates.

A still further object of my invention is to provide a construction of multiple variable condenser which may be manufactured inexpensively on a quantity production basis with means in each of the condenser units, whereby the capacity relationship of the several condensers may be accurately balanced for the simultaneous control of a plurality of electrical circuits associated with the multiple condenser.

My invention will be more fully understood from the specification hereinafter following by reference to the accompanying drawings, in which:

Figure 1 is a perspective view showing the principles of my invention applied to a multiple variable condenser; Fig. 2 is a cross-sectional view of the multiple condenser construction taken on line 2—2 of Fig. 1 and showing one of the rotor plates which has been reduced in area for correcting the capacity of one of the condenser units in relation to the characteristics of an associated electrical circuit; Fig. 3 is a cross-sectional view taken on line 3—3 through one of the condenser units of Fig. 1; Fig. 4 is a detailed view of the lateral mounting which I provide for the stator plates within the frame of the variable condenser and showing the method of gripping the stator plates in the grooves of the conductive block members; Fig. 5 is a front and side view of the conductive block members which are used for supporting the stator plates; Fig. 6 shows one of the insulated members which I provide for spacing the conductive blocks from the condenser frame on each end of the stator plates; Figs. 7, 8 and 9 show the rotor and stator plates which I provide in the condenser assembly; Fig. 10 shows an application of my invention to a single condenser unit; Fig. 11 is a cross-sectional view taken through the condenser unit of Fig. 10 looking in the direction of line 11—11; Fig. 12 is an end view of the single condenser unit of Figs. 10 and 11; and, Fig. 13 is a cross-sectional view taken along line 13—13 of Fig. 12, showing the method of supporting the stator plates in conductive blocks carried within the condenser frame.

My invention finds particular application in uni-control systems for radio receivers where a plurality of electron tube circuits are tuned simultaneously. In receiver systems of this kind it is essential that the capacities and associated inductances be very carefully matched in order that each and every circuit comprising the tuning elements be in resonance throughout the operating range of the receiver. The inductances in the several electrical circuits may be uniformly designed but it is an extremely difficult problem to make the capacities of the respective circuits alike. The capacity of the several condensers will vary in a different manner throughout the operating range due to the inaccuracy of manufacture and this is very difficult to overcome. I have solved this problem by providing a rotor plate in each of the sets of rotor plates in a multiple variable condenser which may be changed in area to correct for differences in the capacities of the several associated circuits. I provide rotor plates with radial slots therein providing segments in the rotor plate by which a perfect balance of capacity between respective condensers may be secured. The method which I employ lends itself readily to quantity production whereby condensers of accurate capacity values may be manufactured.

Referring to the drawings in more detail reference characters 1 and 2 represent end plates of a multiple variable condenser carried in a frame constituted by interconnecting rod members 3, 4, 5, 6, 7 and 8. Bearings 9 and 10 are provided in the end plates 1 and 2 in which a shaft 11 is journaled. The shaft 11 carries independent sets of rotor plates 12, 14 and 15, arranged to be interleaved with sets of stator plates 16, 17 and 18, which are supported in the condenser frame in any suitable manner, such as that described in my co-pending applications for Letters Patent, Serial Nos. 15,516, filed March 14, 1925 and 58,635, filed September 25, 1925. The groups of stator plates are alternately positioned in the condenser frame on opposite sides of the rotor shaft 11, in order to balance the condenser, that is to say, the stator plates 16 are secured in position between the vertically extending frame members 4 and 6. The group of stator plates 17 is secured between the vertically extending frame members 3 and 5, while the group of stator plates 18 is secured between the vertically extending frame members 4 and 6, similar to the support for the set of stator plates 16. The end plate, of each of the sets of rotor plates 12, 14, 15, as illustrated at 19, 20 and 21, is provided with any desired number of radial slots 19a, 20a and 21a. These slots form the rotor plates into the required number of sectors having the required capacity with respect to the angular displacement of the plates. As will be observed more particularly in Fig. 7, the slots in the rotor plates extend radially and reduce the area of the rotor plates to such a degree that for similar angular displacements of the rotor plates with respect to the stator plates equal control of several electrical circuits may be effected.

The stator plates 16 are secured within the condenser frame by means of conductive blocks 22 and 23, having lateral grooves therein, into which the peripheral edges of the stator plates 16 are fitted, maintaining the stator plates rigidly in position under compression in planes parallel with the plates. The conductive blocks 22 and 23 are insulatingly supported with respect to the frame members 4 and 6, by means of insulated block members 24 and 25. In a similar manner the groups of stator plates 17 are carried in grooved conductive blocks 26 and 27 secured in position by means of insulated blocks 28 and 29 secured to frame members 3 and 5. The groups of stator plates 18 are secured in position between conductive blocks 30 and 31 positioned between insulated block members 32 and 33. The arrangement of the condenser units is shown more clearly in the cross-sectional views of Figs. 2 and 3, where Fig. 2 is a view looking down upon the first condenser unit in the frame. The rotor plates 15 have their end plate 21 slotted radially at 21a for securing the desired capacity variation in the multiple condenser system.

The method of supporting the stator plates 18 will be understood more particularly from Figs. 4, 5 and 6 where the conductive blocks 30 are shown provided with laterally extending grooves 30a, in which the peripheral notched edges 18a of the stator plates 18 may be set and then secured in position by forcing the metal of the conductive block laterally against the faces of the condenser plates, as indicated by the depressed portions 30b. Each conductive block, as represented by the block 30 in Fig. 4, has a pair of conical recesses 30c into which the insulated block member 32 is arranged to fit. The insulating block member 32 has a longitudinally extending portion 32a with a pair of bushings 32b extending from one side thereof adjacent opposite ends of the insulated block 32, while conical portions 32c extend from the other side thereof opposite the bushings 32b. The conical portions 32c fit into the conical depressions 30c of the conductive block 30. The insulated block 32 is secured with respect to the conductive block 30 by means of a screw member 37 which passes through an aperture 32d in the insulated block 32. The screw member 37 may form a binding terminal for the stator plates 18 and similarly a terminal 38 may be provided in connection with conductive block 31 on the opposite side of the stator plates 18. The bushing 32b carries screw threaded ferrule members 32e therein, in which screws 39 and 40 may be passed through the frame members as at 6. This arrangement of insulating block enables the stator plates to be secured rigidly in position at the same time that di-electric losses are reduced to a minimum.

The condenser frame may be mounted on bracket members 34 and 35. The other groups of stator plates may be similarly mounted between conductive blocks supported by insulated blocks as has been described.

In Figs. 10 to 13, I have shown the principles of my invention as applied to a single condenser unit where the rotor plates 15 are secured upon rotary shaft 11 which is journaled at 9 and 10 in end plates 1 and 2. I have represented the end plates 1 and 2 as supported one with respect to the other by means of interconnecting rod members designated generally by 41 and supporting the set of stator plates 18 in spaced relationship in parallel grooves in the conductive blocks 30 and 31. The conductive blocks 30 and 31 are supported between insulators 42 and 43 which fit in socket recesses 44 and 45 formed in the end plates 1 and 2 of the condenser frame with the other end of the insulators 42 and 43 fitting into cup members 46 and 47 carried in the ends of the conductive blocks. The socket recesses 44 and 45 may be produced in the end plates 1 and 2 by a simple die pressing operation in the process of manufacture. One of the plates in the set of rotor plates may be slotted, as represented at 21 providing the radial slots 21a as heretofore described in connection with the multiple condenser structure. By this means the capacity relation between the sets of stator and rotor plates may be readily adjusted by bending different segments of the slotted plates of each condenser away from or toward the adjacent plates. It will be observed that any desired shape may be given to the sets of stator plates 16, 17 and 18 for securing capacity variation in accordance with any desired law, such as a straight line frequency characteristic curve. The sets of stator plates are suitably secured together in grooves by means of bolt members 36 passing through apertures 36a in the peripheries of the plates. By properly aperturing one of the rotor plates of each of the grooves of rotor plates by means of radial slots the portions of the plates are made sufficiently flexible to allow bending to selected positions for securing a desired capacity relationship between the cooperating sets of stator and rotor plates. The matching of several stages of amplification may be effected by means of the condenser system of my invention by bending the different segments of the condenser to selected positions. In some of the stages it may be necessary to move a large number of segments toward the other plates of the condenser, while in other stages it may be necessary to move the segments in an opposite direction.

It will be understood that other methods of cutting the rotor plates may be employed in order to secure the desired capacity relationship between the stator and rotor plates and I desire that it be understood that other modifications may be made in the condenser construction within the scope of the appended claims without departing from the spirit of my invention.

What I claim and desire to secure by Letters Patent of the United States is as follows:

1. A variable condenser comprising a frame having flat end plates interconnected by rod members, a plurality of stator plates, a rotatable shaft journaled in said frame, a plurality of rotor plates carried by said shaft and arranged to be interleaved with said stator plates, said stator plates being positively spaced one from another by conductive blocks engaging opposite peripheral edges thereof, a pair of conical recesses in one face of said conductive blocks, and insulation means comprising blocks having conical projections thereon arranged to fit into said conical recesses and means for positioning said blocks between said interconnecting rod members for supporting said stator plates within said frame.

2. A variable condenser comprising a frame having flat end plates interconnected by rod members, a plurality of stator plates, a rotatable shaft journaled in said frame, a plurality of rotor plates carried by said shaft and arranged to be interleaved with said stator plates, said stator plates being positively spaced one from another by conductive blocks engaging opposite peripheral edges thereof, a plurality of recesses in said conductive blocks in sides opposite the sides engaging said stator plates, and means comprising insulation blocks secured to opposite interconnecting rod members and having insulated projections arranged to extend into said recesses for securing said stator plates rigidly in position.

SAMUEL COHEN.